United States Patent
Wakiyama et al.

(10) Patent No.: US 6,803,946 B1
(45) Date of Patent: Oct. 12, 2004

(54) VIDEO CAMERA APPARATUS WITH PRESET OPERATION AND A VIDEO CAMERA MONITOR SYSTEM INCLUDING THE SAME

(75) Inventors: Koji Wakiyama, Yokohama (JP); Katsumi Yano, Yokohama (JP); Haruo Kogane, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/334,593

(22) Filed: Jun. 17, 1999

(30) Foreign Application Priority Data

Jul. 27, 1998 (JP) ............................................ 10-210969

(51) Int. Cl.⁷ ............................ H04N 5/232; H04N 7/18
(52) U.S. Cl. ............................... 348/211.6; 348/211.9; 348/211.13; 348/143
(58) Field of Search ................................ 348/143, 152, 348/153, 154, 155, 159, 208.12, 208.14, 211.4, 211.5, 211.6, 211.9, 211.11, 211.13

(56) References Cited

U.S. PATENT DOCUMENTS

| | | | |
|---|---|---|---|
| 4,910,593 A | * 3/1990 | Weil | 348/164 |
| 5,111,288 A | * 5/1992 | Blackshear | 348/143 |
| 5,111,410 A | * 5/1992 | Nakayama et al. | 348/157 |
| 5,128,708 A | * 7/1992 | Murayama et al. | 396/168 |
| 5,335,072 A | * 8/1994 | Tanaka et al. | 348/231.3 |
| 5,517,236 A | 5/1996 | Sergeant et al. | |
| 5,576,799 A | 11/1996 | Iwasaki | |
| 5,617,141 A | 4/1997 | Imaide et al. | |
| 5,959,667 A | * 9/1999 | Maeng | 348/213 |
| 6,014,167 A | * 1/2000 | Suito et al. | 348/169 |
| 6,111,980 A | * 8/2000 | Sano et al. | 382/167 |
| 6,129,097 A | * 10/2000 | Papandrea | 134/37 |
| 6,133,941 A | * 10/2000 | Ono | 348/143 |
| 6,160,581 A | * 12/2000 | Higashihara et al. | 348/364 |
| 6,184,940 B1 | * 2/2001 | Sano | 348/655 |
| 6,219,097 B1 | * 4/2001 | Kamishima et al. | 348/297 |
| 6,445,410 B2 | * 9/2002 | Kawano | 348/143 |
| 2001/0033332 A1 | * 10/2001 | Kato et al. | 348/143 |
| 2001/0043272 A1 | * 11/2001 | Sato et al. | 348/213 |

FOREIGN PATENT DOCUMENTS

| | | |
|---|---|---|
| EP | 0 823 814 | 2/1998 |
| EP | 0865212 A2 | 9/1998 |
| EP | 0866608 A2 | 9/1998 |
| JP | 2542870 | 7/1996 |
| JP | 9-502331 | 3/1997 |
| WO | WO 9535624 | 12/1995 |

* cited by examiner

Primary Examiner—Wendy R. Garber
Assistant Examiner—Lin Ye
(74) Attorney, Agent, or Firm—Louis Woo

(57) ABSTRACT

A preset operation is effected to a video camera which takes an image around it, generates a video signal from the image, processing and outputting the video signal. The video camera includes electrical control unit for controlling the video camera to process the video signal in accordance with preset video signal control data in the preset setting operation in addition to the preset operation by a mechanical control unit of the video camera in accordance with preset position data. A non-volatile memory stores the preset data including the position data and video signal control data in response to a preset data storing command. Time data includes the preset time data and month data or four-seasons data to distinguish between nighttime and daytime. The preset video signal control data immediately provides a clear video image on the monitor display irrespective of nighttime and daytime. The preset data may be inputted from the display monitor site by an operator or obtained from the mechanical control unit such as a pan encoder and a tilt encoder and from the video signal processing circuit.

14 Claims, 5 Drawing Sheets

VIDEO CAMERA APPARATUS WITH PRESET OPERATION AND A VIDEO CAMERA MONITOR SYSTEM INCLUDING THE SAME

BACKGROUND OF THE INVENTION

1. Field of the Invention

This invention relates to a video camera apparatus with a preset operation and a video camera monitor system including the same.

2. Description of the Prior Art

A video camera monitor system including a video camera with a pan and tilt mechanism and a display monitor with an operation terminal for controlling the video camera nd the pan and tilt mechanism is known. International Publication Number WO95/35624 discloses such a video camera monitor system. Japanese patent application provisional publication No. 1-129687 discloses that a coordinate position of the video camera is written in a memory as a new target position in response to a write command.

On the other hand, Japanese patent application provisional publication No. 9-79168 (U.S. patent application Ser. No. 09/041,751, European Patent application provisional publication EP 0 865 212 A2) filed by the same applicant discloses that a television camera combines a long exposure video signal with a short exposure video signal to provide the combined video signal. Moreover, Japanese patent application provisional publication No. 9-83422 (U.S. patent application Ser. No. 09/042,628, European Patent application provisional publication EP 0 866 608 A2), filed by the same applicant discloses that a video camera compensates the gradation characteristic of the video signal in accordance with the detected histogram.

SUMMARY OF THE INVENTION

The aim of the present invention is to provide a superior video camera apparatus with a preset operation and a superior video camera monitor system including the same.

According to the present invention, a video camera apparatus is provided which includes: a video camera unit for taking an image around it, generating a video signal from the image, processing and outputting the video signal; a mechanical control unit for controlling the video camera unit in accordance with position data; an electrical control unit for controlling the camera unit to process the video signal in accordance with video signal control data; a preset data memory (a non-volatile memory) responsive to a preset data storing command for storing preset data including time data, the position data, and the video control data; a time signal generation circuit for generating a time signal; and a preset operation portion responsive to a preset operation command for monitoring the time signal with reference to the time data and reading the position data and the video control data from the preset data memory when the time data corresponds to the present time signal, and supplying the position data to the mechanical control unit and the video control data to the electrical control circuit to control the video camera unit.

In the video camera apparatus, the position data includes pan position data and tilt position data. The mechanical control unit includes a panning mechanism for panning the camera unit in accordance with the pan position data and a tilting mechanism for tilting the camera unit in accordance with the tilt position data.

In the video camera apparatus, the position data includes zoom position data, focus position data, and diaphragm position data, and the camera unit includes a zoom lens unit, a focusing unit, and a diaphragm unit. The mechanical control unit includes a zoom control circuit for controlling the zoom lens unit in accordance with the zoom position data; a focus control circuit for controlling the focussing unit in accordance with the focus position data; and a diaphragm control circuit for controlling the diaphragm unit in accordance with the diaphragm position data.

In the video camera apparatus, the time data includes data for distinguishing between day and night. In this case, the time data may include present time data and month data. Moreover, the time data may include preset time data four-seasons data.

In the video camera apparatus, the video control data includes gradation compensation data, automatic-gain control data, white balance data, electronic sensitivity control data, character superimpose data, shutter speed data, motion detection data, and synchronizing data. The electrical control unit includes: a gradation compensation circuit for compensating a gradation characteristic in accordance with the gradation compensation data; an automatic-gain control circuit for control a gain of the video data in accordance with the automatic-gain control data or the electronic sensitivity control data; a white balance control circuit for controlling a white balance of the video data in accordance with the white balance data; an electronic sensitivity control circuit for controlling a sensitivity of the video camera unit in accordance with the electronic sensitivity control data; a character superimposing circuit for superimposing character data on the image in the video signal in accordance with the video character superimpose data; a shutter speed control circuit for controlling a shutter speed of the video camera unit in accordance with the shutter speed data; a motion detection circuit for detecting a motion in the video signal in response to the motion detection data; and a synchronizing circuit for providing a synchronous operation to the video signal in accordance with the synchronizing data. In this case, the gradation compensation data includes gamma compensation characteristic data, short and long exposure video signal combining characteristic data, short exposure video signal shutter speed data, and white balance data. The video camera unit includes a video processing circuit which includes: a gamma compensation circuit for controlling a gamma of the video signal in accordance with the gamma compensation characteristic data; a short and long exposure video signal combining circuit for generating short exposure video data and long exposure video data at substantially the same time, combining the short exposure video data and the long exposure video data to generate the video signal in accordance with the short and long exposure video signal combining characteristic data, the short exposure video signal shutter speed data, and the white balance data.

According to this invention there is a provided a video camera monitor system including: a video camera unit for taking an image around it, generating a video signal from the image, processing and outputting the video signal; a mechanical control circuit for controlling the video camera unit to take the image in accordance with position data and a manual operation command; an electrical control circuit for controlling the camera unit to process the video signal in accordance with video signal control data and the manual operation command; a data receiving circuit for receiving a manual operation command, a preset data storing command, and a preset operation command; a manual operation circuit for operating the mechanical control unit and the electrical control unit in response to the manual operation; a data obtaining portion for detecting the position data from the mechanical control unit and the video signal control data from the electrical control unit in response to the preset storing command; a time signal generation circuit for generating a present time signal; a preset data memory (a non-volatile memory) responsive to the preset data storing command for storing the position data, the video signal control data from the data obtaining circuit and the present time signal as preset time data; a preset operation portion responsive to a preset operation command for monitoring the present time signal with reference to the preset time data and reading and supplying the position data from the preset data memory to the mechanical control unit and the video control data from the preset data memory to the video processing circuit to control the video camera unit when the time data corresponds to the present time signal; and a display monitor terminal including: a display monitor for displaying the image in accordance with the video signal; and a terminal unit responsive to an operator for generating and transmitting the manual operation command, the preset data storing command, and the preset data operation command.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described an embodiment of this invention.

Figure 1:
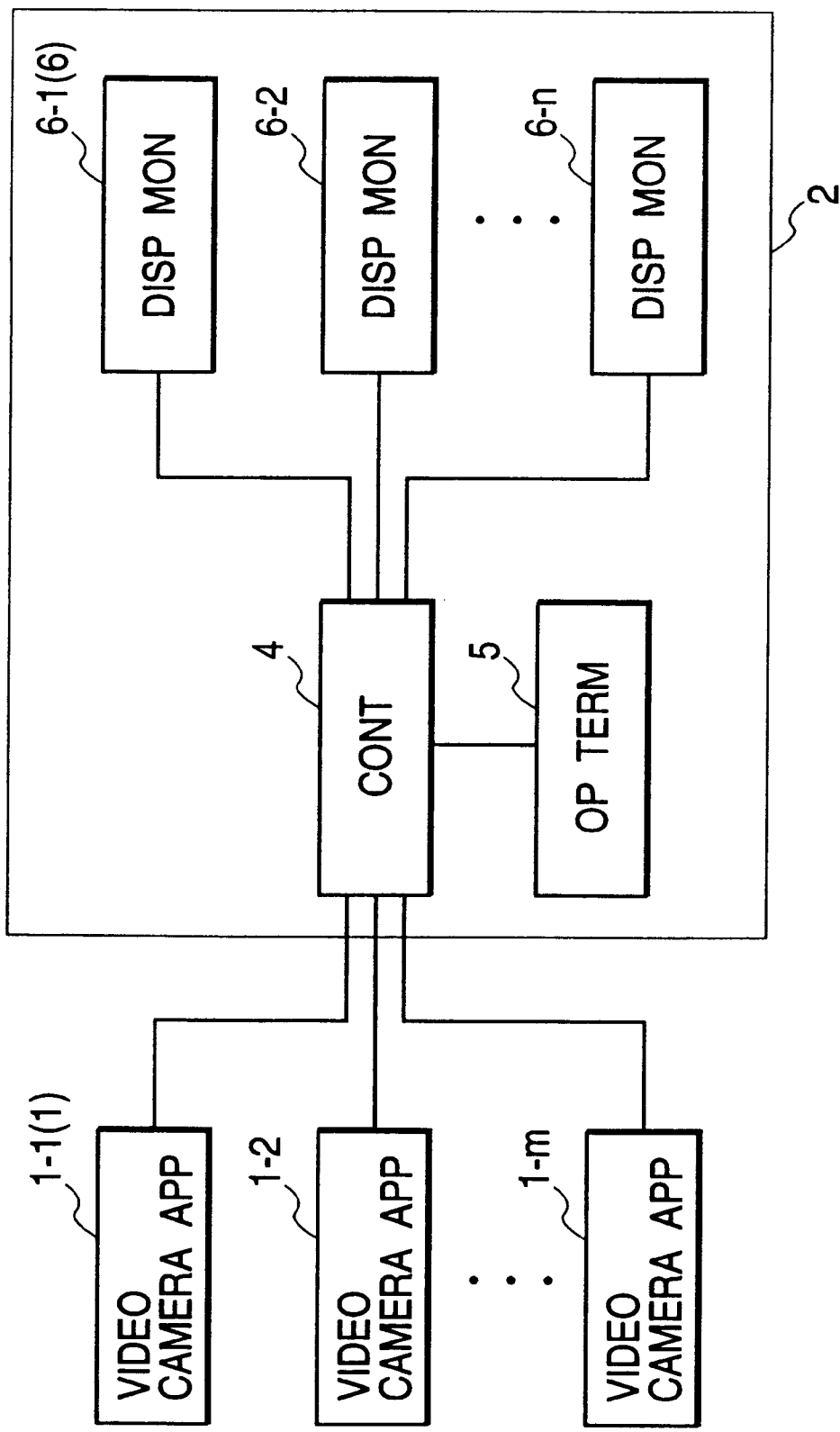
FIG. 1 is a block diagram of a video camera monitor system of an embodiment of this invention.

FIG. 1 is a block diagram of a video camera monitor system of an embodiment of this invention.

The video camera monitor system includes a video camera apparatus 1 and a monitor site 2 coupled to the video camera apparatus through cables or a network. In FIG. 1, the number of the video cameras 1-1 to 1-m coupled to the monitor site 2 is the same as that of the display monitors 6-1 to 6-n. However, it is possible that only one display monitor 6 can display all images from the video cameras 1-1 to 1-m by dividing the image screen of the display monitor 6. Therefore, there are variable displaying methods.

Figure 2:
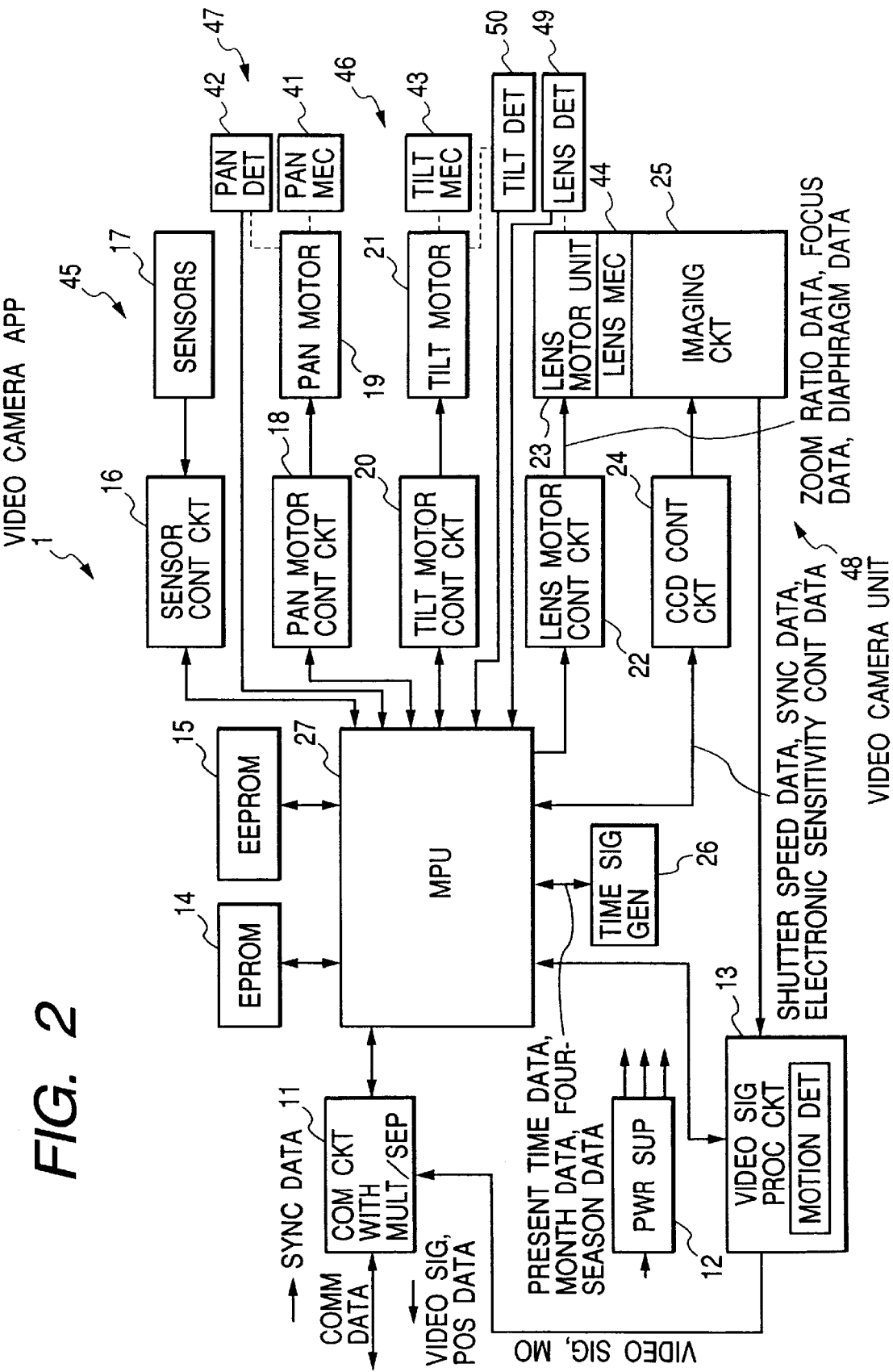
FIG. 2 is a block diagram of the video camera apparatus of this embodiment shown in FIG. 1.

FIG. 2 is a block diagram of the video camera apparatus shown in FIG. 1.

The video camera apparatus 1 (1-1 to 1-m) includes a microprocessor 27 for controlling respective circuits of the video camera apparatus 1, an EPROM (Electrically programmable read-only memory) 14 for storing programs for predetermined operations and daytime/nighttime calculation data for distinguishing between nighttime and daytime, an EEPROM (Erasable programmable read-only memory) 15 for storing data, such as preset data, a communication circuit 11 for communicating with the monitor site 2 through the cable or the network with multiplexing data with a video signal to transmit the data and the video data through the cable or the network and for receiving command data by separation and preset data, a power supply 12 for supplying powers to respective circuits of the video camera apparatus 1, a video camera unit 48 for receiving an image around the video camera apparatus 1 and generates an image signal, a video signal processor 13 for processing the image signal from the imaging circuit 25 to generate a video signal from the image signal and transmitting the video signal to the monitor site 2 through the communication circuit 11, a tilting unit 46 for tilting the video camera unit 48, a panning unit 47 for panning the video camera unit 48, a sensor unit 45 for detecting conditional data around the video camera apparatus 1 and sending the conditional data to the microprocessor 27, and a time signal generation circuit 26 for a generating a time signal including the present time data, day data, month data, and four-season data. Instead the nighttime/daytime calculation data for distinguishing between nighttime and daytime, a data table for distinguishing between nighttime and daytime can be used. Moreover, the time signal generation circuit 26 may output data indicative of nighttime and daytime.

The video camera unit 48 includes a CCD control circuit 24, the imaging circuit 25 including a CCD imager (not shown) which is driven by the CCD control circuit 24 in response to microprocessor 27, a lens mechanism 44 for forming the image around the video camera unit 48 on the CCD imager by a zoom lens with focus and the diaphragm controlled, a lens motor unit 23 for controlling a zoom ratio, a focus of the zoom lens, and the diaphragm of the zoom lens, and a lens motor control circuit 22 for controlling the lens motor unit 23 in response to microprocessor 17, and a lens detector 49 for detecting position of the motors in the lens motor unit 23.

The tilting unit 46 includes a tilting mechanism 43 for supporting and tilting the video camera unit 48, a tilt motor 21 for driving the tilting mechanism 43, a tilt motor control circuit 20 for controlling the tilt motor 21 in response to the microprocessor 27, a tilt detector 50 for detecting a position of the tilt motor 21 indicative of a tilt angle of the tilt mechanism 43 and sending the tilt angle data to the microprocessor 27.

The panning unit 47 includes a panning mechanism 41 for supporting and panning the video camera unit 48, a pan motor 19 for driving the panning mechanism 41, a pan motor control circuit 18 for controlling the pan motor 19 in response to the microprocessor 27, a pan detector 42 for detecting a position of the pan motor 19 indicative of a pan angle of the pan mechanism 41 and sending the pan angle data to the microprocessor 27.

The sensor unit 45 includes sensors 17 including a thermometer for measuring a temperature inside of a case (not shown) of the video camera apparatus 1, a hygrometer (not shown) for measuring a humidity inside the case of the video monitor apparatus 1, open/close sensors (not shown) for detecting open/close conditions of doors and windows, a human body sensors (not shown), and a sensor control circuit 16 for controlling the sensors 17 and sending the results of the sensors 27.

The power supply 12 receives an ac power and generates DC voltages to supply them to respective circuits of the video camera apparatus 1.

The monitor site 2 includes a controller 4 for generating and transmitting command data and receives the signal from the communication 11 and separates data from the communication circuit 11 into the video signal and the data from the microprocessor 1 such as the results of the sensors 17, an operation terminal 5 for receiving input of a manual operation command, a preset data storing command, and a preset data operation command from an operator, which are transmitted by the controller 4 to the video camera apparatus 1.

The EEPROM 15 stores data, such as the preset data and is erasable, so that the data can be rewritten.

The operator operates the operation terminal 5 to operate the video camera apparatus 1 to effect a manual operation, a preset storing operation, and a preset operation. The preset operation specifies the operation of the video camera apparatus 1 with respect to time. For example, the preset operation specifies that the video camera unit 48 is directed to which angle, or that video camera unit 48 is successively directed to respective doors and windows in a room with respect to the present time. The controller 4 transmits the manual operation command, the preset data storing command, or the preset operation command to the microprocessor 27. The microprocessor 27 receives the commands through the communication circuit 11.

Figure 3:
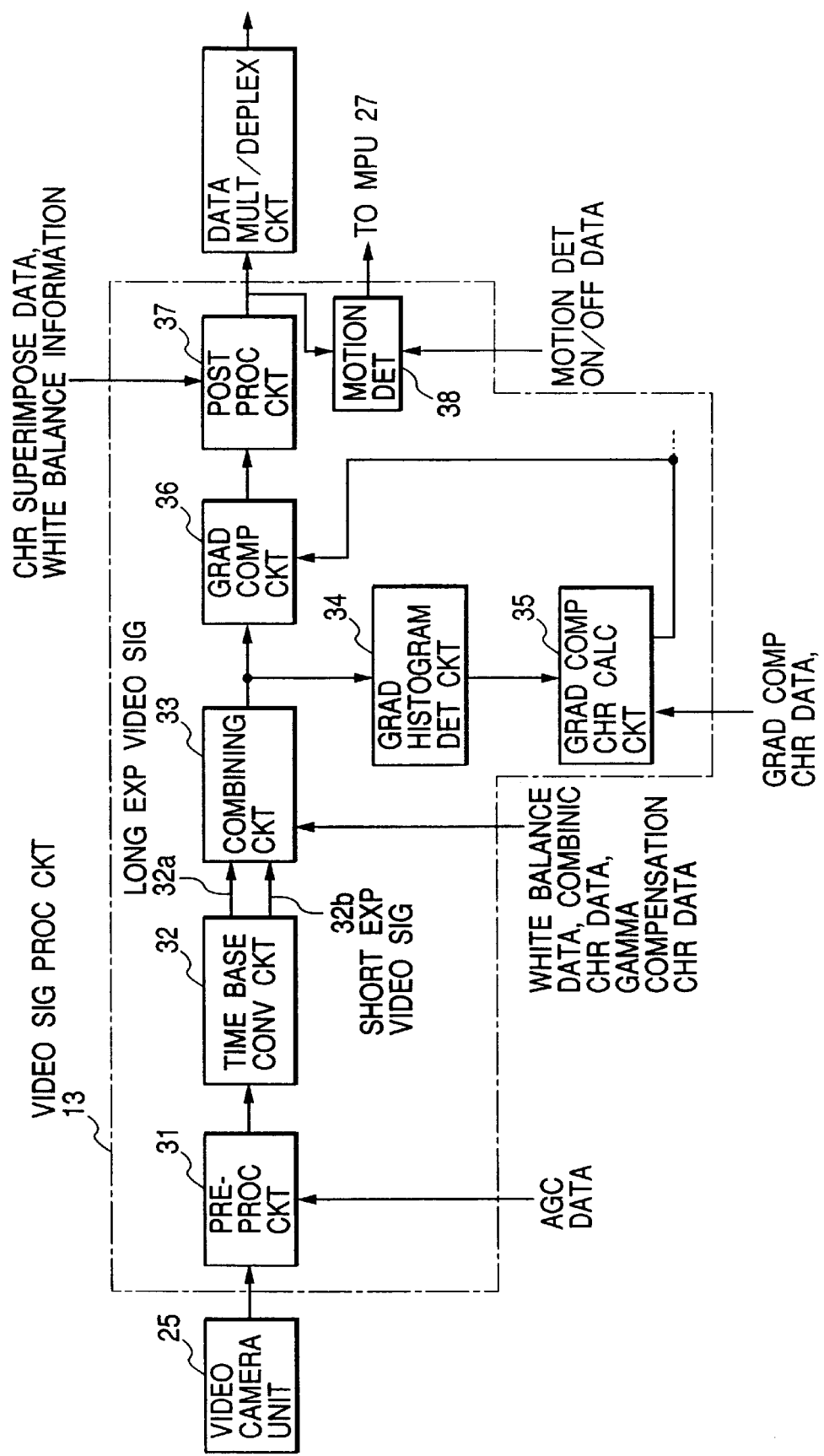
FIG. 3 is a block diagram of a video signal processing circuit shown in FIG. 2.

FIG. 3 is a block diagram of a video signal processing circuit 13 shown in FIG. 2.

The video signal processing circuit 13 includes a preprocessing circuit 31, a time base conversion circuit 32, a combining circuit 33, a gradation compensation circuit 36, a post processing circuit 37, a gradation histogram detection circuit 34, a gradation compensation characteristic calculation circuit 35, and a motion detection circuit 38 for detecting a motion in the image of the output video signal.

The pre-processing circuit 31 effects the CDS-processing (CDS: correlation duplex sampling), the AGC (automatic gain control) processing, and a/d converting process to the video signal from the video camera unit 25. The CCD control circuit 24 controls the imaging circuit 25 such that the video signal is generated at a relative long exposure interval as a long exposure video signal and then, a video signal is generated at a relative short exposure interval successively as a short exposure video signal but the long exposure video signal and the short exposure video signal are outputted substantially at the same time every field, so that the long exposure video signal and the short exposure video signal represent substantially the same instant image but the exposure intervals are different. The short exposure video signal more faithfully represents the highlight to middle tone. On the other hand, the long exposure video signal more clearly represents the middle tone to the shadow level.

The time base conversion circuit 32 coverts the time base of the long exposure video signal and the short exposure signal such that both the long exposure video signal and the short exposure signal are outputted at the same time, that is, the time different between the long exposure video signal and the short exposure signal is eliminated by delaying the long exposure video signal or the short exposure video signal.

The combining circuit 33 combines the long exposure video signal 32a with the short exposure video signal 32b to generate a combined video signal to provide an expanded gradation scale, wherein a high light portion of the short exposure video signal 32a and a shadow portion of the long exposure video signal 32b are used to generate the combined video signal to expand the dynamic range. More specifically, the long exposure video signal 32a is combined with the short exposure video signal 32b with level adjusting and gain adjustment to provide a suitable gradation characteristic and a suitable white balance. Combining the long exposure video signal and the short exposure signal is provided by successively varying a combining ratio of the long exposure video signal and the short exposure video signal through a combining range (middle tone). That is, the combining ratio of the short exposure video signal decreases with darkness of the short exposure video signal. On the other hand, the combining ratio of the long exposure video signal complementary increases with darkness of the long exposure video signal, wherein the total of the combining ratio of the short video signal and the long exposure video signal is one through the combining range.

The combined video signal from the combining circuit 33 is supplied to a gradation histogram detection circuit 34 and to a gradation compensation circuit 36. The gradation histogram detection circuit 34 detects histogram of gradation values of respective pixels and detects the maximum gradation value which is supplied to a gradation compensation characteristic calculation circuit 35. The gradation compensation characteristic calculation circuit 35 calculates the gradation compensation characteristic in accordance with the detected maximum gradation value of the histogram. The gradation compensation circuit 36 compensates the gradation characteristic of the combined video signal in accordance with the gradation compensation characteristic calculated by the gradation compensation characteristic calculation circuit 35. The post processing circuit 37 generates the output video signal to be supplied to the controller 4. The operation of the gradation compensation characteristic calculation circuit 35 may be provided by the microprocessor 27.

The video camera apparatus 1 generates the video signal control data automatically. However, in the preset control operation, when the video camera unit 48 is directed to another place or tuning on the video camera unit by the preset operation, the initial video control data may be not suitable. Then, the microprocessor 27 initially sets one group of the video signal control data in the preset operation. For example, the automatic gain control data is initially set. On the other hand, the motion detection on/off data is used through the preset operation.

For the preset operation, the microprocessor 27 sets automatic-gain control data to the pre-processing circuit 31, white balance information to the post processing circuit 37, the electronic sensitivity control data, shutter speed data, synchronizing data to the CCD control circuit 24, character superimpose data to the post processing circuit 37, motion detection on/off data to the motion detection circuit 38, and gradation compensation data to the combining circuit 33, gradation compensation characteristic calculation circuit 35, and the CCD control circuit 24.

Then, the preprocessing circuit 31 controls the gain of the video signal in accordance with the automatic-gain control data from the microprocessor 27 set by the preset operation. Moreover, the post processing circuit 37 controls a white balance of the combined video signal in accordance with the white balance information. Moreover, the microprocessor 27 controls the sensitivity of the video camera unit 48 in accordance with the electronic sensitivity control data by controlling the CCD control circuit 24. Moreover, the post processing circuit 37 superimposes character data from the microprocessor 27 on the image in the combined video signal in accordance with the character superimpose data. Moreover, the microprocessor 27 controls a shutter speed of the video camera unit 48 in accordance with the shutter speed data by controlling the CCD control circuit 24.

Moreover, the motion detection circuit 38 detects a motion in the output video signal in response to the motion detection on/off data and supplies the result of motion detection to the microprocessor 27. Moreover, the microprocessor 27 controls the CCD control circuit 24 to provide a synchronous operation to the video signal in accordance with the synchronizing data.

As the gradation compensation data, the microprocessor 27 sets gamma compensation characteristic data, short and long exposure video signal combining characteristic data, and white balance data to the combining circuit 33. The combining circuit 33 combines the long exposure video signal with the short exposure video signal in accordance with the gamma compensation characteristic data, the short and long exposure video signal combining characteristic data indicative of the combining ratio, and white balance data. Moreover, the microprocessor 27 sets the short exposure video signal shutter speed data as the gradation compensation data. The CCD control circuit 24 controls the exposure interval of the short exposure video signal in accordance with the short exposure video signal shutter speed data.

The combining circuit 33 controls gammas of the long exposure video signal and the short exposure video signal in accordance with the gamma compensation characteristic data, combines the short exposure video data and the long exposure video data to generate the video signal in accordance with the short and long exposure video signal combining characteristic data and the white balance data.

The gradation compensation circuit 36 compensates the gradation characteristic in accordance with the gradation compensation characteristic data from the microprocessor 27 via the gradation compensation characteristic calculation circuit 35. The gradation compensation characteristic circuit 35 initially uses the gradation compensation characteristic data from the microprocessor 27. However, if there is sufficient data to calculate the gradation compensation characteristic, the gradation compensation characteristic calculation circuit supplies the calculated gradation compensation characteristic data to the gradation compensation circuit 36.

Combining the long exposure video signal with the short exposure video signal is described in U.S. patent application Ser. No. 09/041,751, the disclosure of which is hereby incorporated by reference.

Compensating the gradation characteristic is described in U.S. patent application Ser. No. 09/042,628, the disclosure of which is hereby incorporated by reference.

Figure 4:
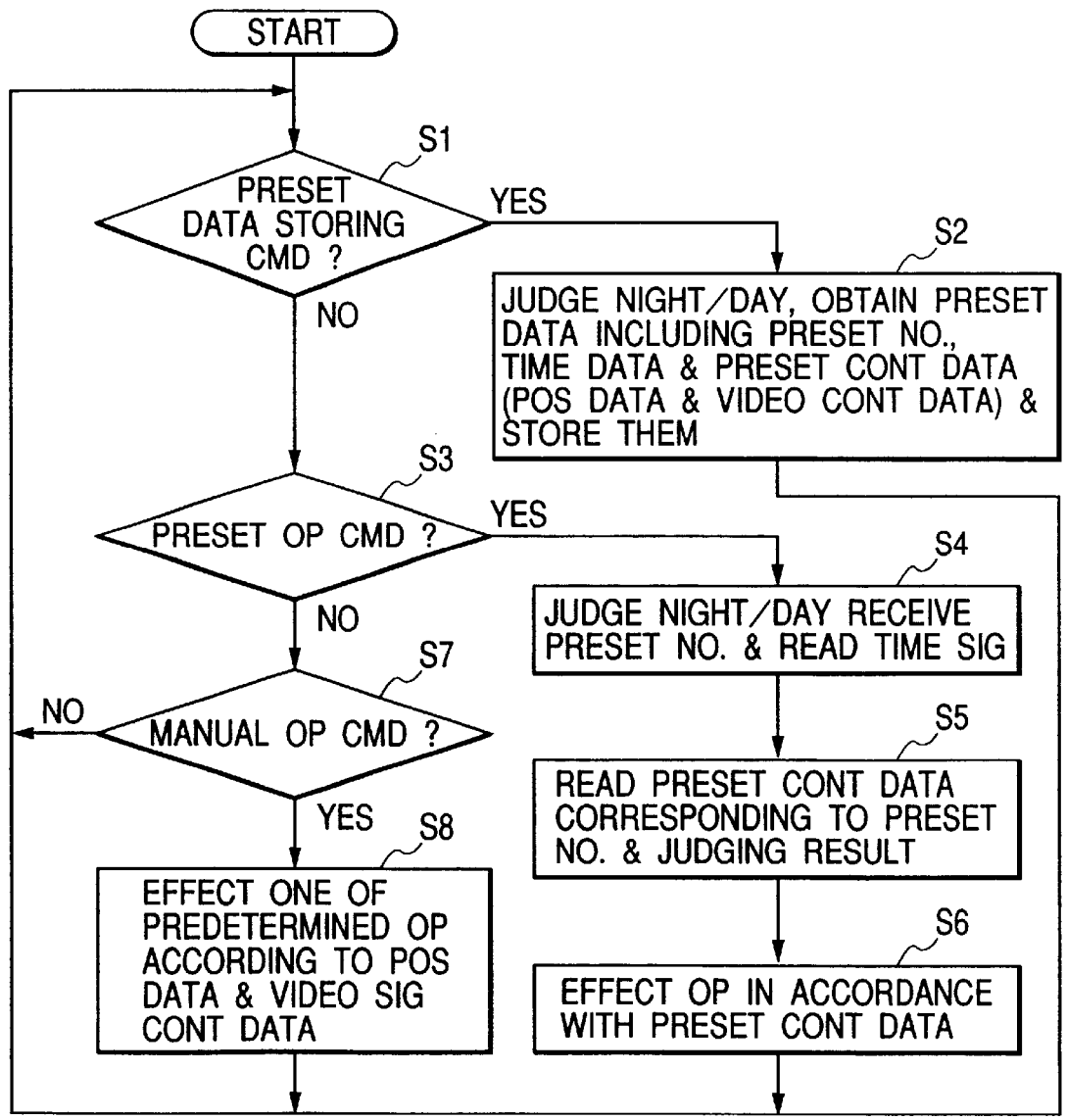
FIG. 4 depicts a flow chart of this embodiment showing the operation of the microprocessor shown in FIG. 2.

FIG. 4 depicts a flow chart of this embodiment showing the operation of the microprocessor 27.

The preset data setting operation is effected by inputting the preset data storing request and all of the preset data. Alternatively, the preset data setting operation is effected by inputting the preset storing request and a portion of the preset data. In this case, the microprocessor 27 obtains the remaining portion of the preset data from respective circuits of the video camera apparatus and set the position data and video control data in the EEPROM 15.

At first, the operator operates the operation terminal 5 to send a manual operation command to the video camera apparatus 1 through the controller 4 to make the video camera apparatus 1 in the preset data storing condition.

On the other hand, in the video camera apparatus 1, if the communication data from the controller 4 includes the manual operation command in step s7, the microprocessor 27 effects one of predetermined operations in accordance with the position data and the video signal control data included in the manual operation command in step s8.

The operator repeats this operation to obtain the position data and video control data suitable for the preset data storing operation. Then, the operator operates the operation terminal 5 to send the preset data storing command including preset data to the video camera apparatus 1.

In the video camera apparatus 1, if the communication data from the controller 4 includes the presetting command in step s1, the microprocessor 27 receives preset data from the controller 4 and obtains the position data from the pan detection circuit 42, the tilt detector 50, and the lens detection circuit 49 and video signal control data from the CCD control circuit 24 and the video signal processing circuit 13 or the video control data stored in the RAM (not shown) thereof of the EEPROM 15 if there is insufficient preset data. That is, the microprocessor 27 stores the preset data including preset number, time data, preset control data including position data and video control data in step s2. Moreover, the microprocessor 27 judges whether it is nighttime or daytime in accordance with the time signal and the nighttime/daytime calculation data in EPROM 14.

Then, if the operator operates the operation terminal 5 to send the preset operation command to the video camera apparatus in step s3, the microprocessor 27 effects the preset operation in accordance with the time signal from the time signal generation circuit 26 and the preset data in the EEPROM 15.

The preset operation is effected in accordance with the position data, the video signal control data, and the time signal to provide a suitable condition. Moreover, the preset operation is differently effected in accordance with nighttime and daytime mainly. That is, during daytime, the diaphragm is made relatively close but during nighttime, the diaphragm is made open. Moreover, the white balance is different between nighttime and daytime because color temperature of the light sources are different from each other. Therefore, the time data includes month data or four seasons data in addition to the present time data to judge it is nighttime or daytime in accordance with the present time, month data and four season data, and nighttime/daytime calculation data stored in EPROM 14. When the microprocessor 27 judges it is daytime in the preset data setting operation, the microprocessor 27 stores the nighttime/daytime data in addition to the time data in step s2. On the other hand, in the preset operation, the microprocessor 27 judges whether it is nighttime or daytime in step s4 and reads the preset data corresponding to the commanded preset number data and the judging result of step s4, that is, daytime or nighttime in step s5. Then, if the preset operation is to be effected during nighttime, the video signal control data which has been obtained in the night condition is instantaneously set, so that when the video camera unit 48 is directed to the target place in response to the preset operation command, a clear image can be reproduced on the display monitor 6 at the same time irrespective of nighttime and daytime.

In this embodiment, the time data is obtained from the time signal generation circuit 26 in the preset data setting operation. However, it is possible to input the time data by the operation terminal 4. Moreover, it is also possible to input all preset data, that is, the time data, the nighttime/daytime data, the position data, and the video control data from the operation terminal 4.

Figure 5:
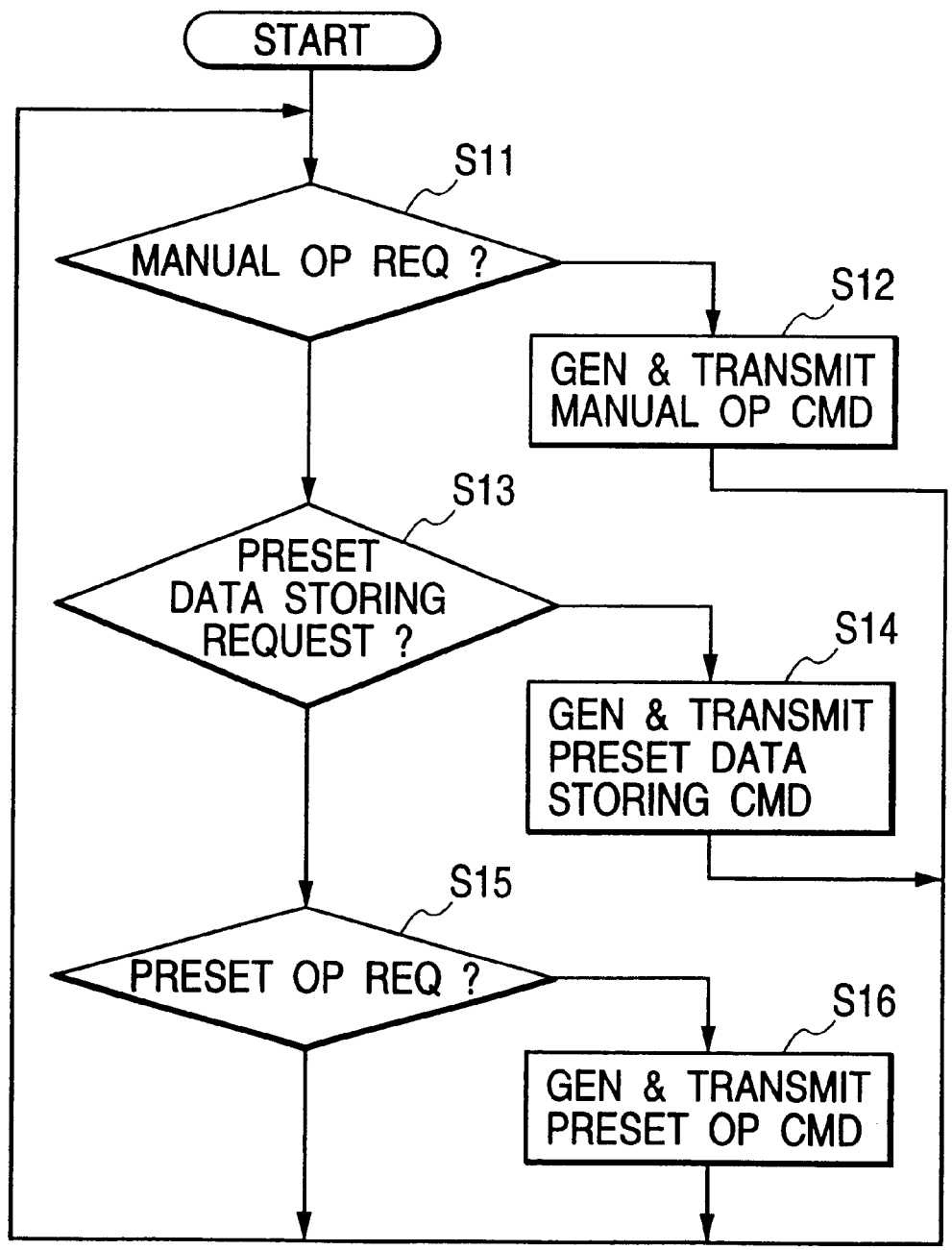
FIG. 5 depicts a flow chart of this embodiment showing operation of the controller shown in FIG. 1.

FIG. 5 depicts a flow chart of this embodiment showing operation of the controller shown in FIG. 1. If the controller 4 receives a manual operation request in step s11, the controller 4 generates and transmits the manual operation command to the microprocessor 27 in step s12.

If the controller 4 receives a preset data storing request in step s13, the controller 4 generates and transmits the preset data storing command to the microprocessor 27 in step s14, wherein a portion or a whole of the preset data is received from the operation terminal 5 and transmitted to the microprocessor 27. The microprocessor 27 receives the preset data storing command and preset data and stores it in EEPROM 15. The remaining preset data is obtained from the pan detector 42, the tilt detector 50, the lens detector 49, and the video signal processing circuit 13. If there is still not specified preset data, the microprocessor 27 obtains the data from the EEPROM 15.

If the controller 4 receives a preset operation request in step s15, the controller 4 generates and transmits the preset operation command to the microprocessor 27 in step s16. The microprocessor 27 receives the preset operation command and starts the preset operation.

If the data from the pan detector 42, the tilt detector 50, the lens detector 49, and the video signal processing circuit 13 is used, at first the operator directs the video camera unit 1 to the target place and controls the lens mechanism 44 and the video signal processing circuit 13 with the manual operation request with the manual operation command. Then, the operator transmits the preset data storing command to the microprocessor 27. The microprocessor 27 receives the preset storing command with the preset data and obtains the remaining preset data from the pan detector 42, the tilt detector 50, the lens detector 49, and the video signal processing circuit 13.

What is claimed is:

1. A video camera apparatus for use in a video monitor system having a monitor site remote from the video camera apparatus where an image picked up by the video camera apparatus may be viewed, the video camera apparatus comprising:

video camera means for taking an image of a particular object placed at a particular position, generating a video signal from the image, processing and outputting the video signal;

preset data storing means, for storing preset data including a piece of position data corresponding to the particular position of the particular object, pieces of time zone data of each of types and pieces of video signal control data, each piece of video signal control data corresponding to the piece of position data and one piece of time zone data of each type conforming to a time;

time signal generating means for generating a time signal;

preset operation means responsive to a preset operation command for receiving the time signal from the time signal generating means in response to a preset operation command from an operator, reading the piece of position data of the particular position specified by the preset operation command from the preset data storing means, specifying pieces of time zone data of the types conforming to the time signal in the preset data storing means, and reading one piece of video signal control data corresponding to the piece of read position data and the pieces of specified time zone data of the types from the preset data storing means;

mechanical control means for mechanically controlling the video camera means according to the piece of position data read by the preset operation means to take the image; and electrical control means for controlling the video camera means to process the video signal according to the piece of video signal control data read by the preset operation means.

2. A video camera apparatus as claimed in claim 1, wherein the piece of position data is a combination of pan position data and tilt position data and the mechanical control means comprises:

panning means for panning the video camera means in accordance with the pan position data; and tilting means for tilting the video camera means in accordance with the tilt position data.

3. A video camera apparatus as claimed in claim 1, wherein the piece of position data is a combination of zoom position data, focus position data, and diaphragm position data, and the video camera means includes a zoom lens unit, a focusing unit, and a diaphragm unit, and the mechanical control means comprises:

zoom control means for controlling the zoom lens unit in accordance with the zoom position data;

focus control means for controlling the focusing unit in accordance with the focus position data; and diaphragm control means for controlling the diaphragm unit in accordance with the diaphragm position data.

4. A video camera apparatus as claimed in claim 1, wherein the pieces of time zone data of one type are data for distinguishing between indicating nighttime and data indicating daytime.

5. A video camera apparatus as claimed in claim 1, wherein the pieces of time zone data of one type are pieces of present time data and month data respectively indicating twelve kinds of calendar months.

6. A video camera apparatus as claimed in claim 1, wherein the pieces of time zone data of one type are pieces of present time data four-season data respectively indicating four seasons.

7. A video camera apparatus as claimed in claim 1, wherein said video control data includes gradation compensation data, automatic-gain control data, white balance data, electronic sensitivity control data, character superimpose data, shutter speed data, motion detection data, and synchronizing data, and wherein said electrical control means includes:

gradation compensation means for compensating a gradation characteristic in accordance with said gradation compensation data;

automatic-gain control means for control a gain of said video data in accordance with said automatic-gain control data;

white balance control means for controlling a white balance of said video data in accordance with said white balance data;

electronic sensitivity control means for controlling a sensitivity of said video camera means in accordance with said electronic sensitivity control data;

character superimposing means for superimposing character data on said image in said video signal in accordance with said video character superimpose data;

shutter speed control means for controlling a shutter speed of said video camera means in accordance with said shutter speed data;

motion detection means for detecting a motion in the video signal in response to said motion detection data; and synchronizing means for providing a synchronous operation to said video signal in accordance with said synchronizing data.

8. A video camera apparatus as claimed in claim 7, wherein said gradation compensation data includes, gamma compensation characteristic data, short and long exposure video signal combining characteristic data, short exposure video signal shutter speed data, and white balance data, and wherein said video camera means includes:

gamma compensation means for controlling a gamma of said video signal in accordance with said gamma compensation characteristic data; and short and long exposure video signal combining means for generating short exposure video data and long exposure video data at substantially the same time, combining said short exposure video data and said long exposure video data to generate said video signal in accordance with said short and long exposure video signal combining characteristic data, said short exposure video signal shutter speed data, and said white balance data, an exposure interval of said long exposure video data being longer than said short exposure video data.

9. A video camera apparatus as defined in claim 1, wherein the preset operation means includes:

judging means for judging whether it is daytime or nighttime from a comparison between the time signal and the pieces of time zone data of one type; and means for reading the piece of position data and the piece of video control data that correspond to a judgement by the judgement means.

10. A video camera apparatus as defined in claim 1, wherein said preset data storing means includes means for storing a part of said preset data that is received with said preset data storing command.

11. A video camera apparatus as defined in claim 1, further comprising:

data receiving means for receiving a manual operation command including said position data and video signal control data, said preset data storing command, and said preset operation command;

manual operation means, responsive to said manual operation command, for operating said mechanical control means and said electrical control means by supplying said position data and said video signal control data included in said manual operation command to said mechanical control means and said electrical control means, respectively, wherein said preset data storing means includes:

means for obtaining the other part of said preset data that is not received with said preset data storing command from said mechanical control means and said electrical control means and storing said other part in said non-volatile memory.

12. A video camera apparatus as claimed in claim 1, wherein the preset data storing means includes a non-volatile memory.

13. A video camera monitor system comprising a video camera apparatus and a display monitor terminal remote from the video camera apparatus, the video camera apparatus comprising:

video camera means for taking an image of a particular object placed at a particular position, generating a video signal from the image, processing and outputting the video signal;

mechanical control means for controlling said video camera means to take said image in accordance with position data and a manual operation command;

electrical control means for controlling said camera means to process said video signal in accordance with video signal control data and said manual operation command;

data receiving means for receiving a manual operation command, a preset data storing command, and a preset operation command;

manual operation means for operating said mechanical control means and said electrical control means in response to said manual operation command;

data obtaining means for detecting said position data from said mechanical control means and said video signal control data from said electrical control means in response to said preset storing command;

data producing means, responsive to the preset data storing command, for producing a piece of position data corresponding to the particular position of the particular objects, pieces of time zone data of each of types and pieces of video signal control data, each piece of video signal control data corresponding to the piece of position data and one piece of time zone data of each type conforming to a time;

preset data storing means for storing the piece of position data, the pieces of time zone data of the types and the pieces of video control data as preset data;

time signal generating means for generating a present time signal indicating a present time;

preset operation means, responsive to the preset operation command, for receiving the present time signal from the time signal generating means, reading the piece of position data of the particular position indicated by the preset operation command from the preset data storing means, specifying pieces of time zone data of the types conforming to the present time signal in the preset data storing means, and reading one piece of video control data corresponding to the piece of read position data and the pieces of specified time zone data of the types from the preset data storing means;

mechanical control means, responsive to the manual operation command, for mechanically controlling the video camera means according to the piece of position data read by the preset operation means to take the image; and electrical control means, responsive to the manual operation command, for controlling the video camera means to process the video signal according to the piece of video signal control data read by the preset operation means;

the display monitor terminal comprising:

display monitor for displaying the image in accordance with the video signal; and terminal means responsive to an operator for generating and transmitting the manual operation command, the present data storing command, and the preset data operation command.

14. A video camera monitor system as claimed in claim 13, wherein the preset data storing means includes a non-volatile memory.

* * * * *